United States Patent
Slye et al.

(10) Patent No.: US 7,191,527 B2
(45) Date of Patent: Mar. 20, 2007

(54) LINEAR DISTANCE MEASUREMENT BY NON-DRIVEN ARM

(75) Inventors: Bradley D. Slye, Plymouth, MN (US); Daniel E. Bisila, Blaine, MN (US)

(73) Assignee: Electro-Sensors, Inc., Minnetonka, MN (US)

( * ) Notice: Subject to any disclaimer, the term of this patent is extended or adjusted under 35 U.S.C. 154(b) by 0 days.

(21) Appl. No.: 11/195,125

(22) Filed: Aug. 2, 2005

(65) Prior Publication Data

US 2007/0028466 A1  Feb. 8, 2007

(51) Int. Cl.
G01B 5/02 (2006.01)
G01B 7/02 (2006.01)
G01B 11/02 (2006.01)

(52) U.S. Cl. .................................... 33/1 PT; 33/700
(58) Field of Classification Search .............. 33/1 MP, 33/1 PT, 503, 556, 709, 700, 832, 833
See application file for complete search history.

(56) References Cited

U.S. PATENT DOCUMENTS

| | | | |
|---|---|---|---|
| 4,229,907 A | 10/1980 | Hall | |
| 4,474,440 A | 10/1984 | Kramer et al. | |
| 4,583,554 A | 4/1986 | Mittelman et al. | |
| 4,676,002 A * | 6/1987 | Slocum | 33/1 MP |
| 5,131,166 A * | 7/1992 | Weber | 33/503 |
| 5,341,574 A * | 8/1994 | Bieg | 33/502 |
| 6,038,815 A | 3/2000 | Manini | |
| 6,149,301 A | 11/2000 | Kautzer et al. | |
| 6,408,573 B1 | 6/2002 | Fukumoto et al. | |
| 6,501,263 B1 | 12/2002 | Nyce | |
| 6,682,157 B2 | 1/2004 | Ito | |
| 2005/0024216 A1 | 2/2005 | Crooks et al. | |

FOREIGN PATENT DOCUMENTS

| | | |
|---|---|---|
| EP | 0 257 100 | 3/1988 |
| WO | WO 1996/26044 | 8/1996 |
| WO | WO 2005/029128 | 3/2005 |

* cited by examiner

*Primary Examiner*—G. Bradley Bennett
(74) *Attorney, Agent, or Firm*—Leffert Jay & Polglaze, P.A.

(57) ABSTRACT

The linear distance measurement apparatus comprises a non-driven arm that is mounted such that an arc movement of the arm describes a linear distance. A rotary sensor mechanism is coupled to the non-driven arm. The sensor measures the arc movement of the arm and translates the arc movement to the linear distance.

16 Claims, 3 Drawing Sheets

LINEAR DISTANCE MEASUREMENT BY NON-DRIVEN ARM

BACKGROUND

I. Field of the Invention

The present invention relates generally to electrical sensors and more particularly to devices to measure linear distance.

II. Description of the Related Art

Doors/slide gates on grain chutes and other similar access hatches are typically moved by hydraulic rams or electric motors in conjunction with a screw drive mechanism or a rack and pinion drive mechanism. Multiple methods can be used to determine the distance of hatch travel during an opening or closing operation.

For example, in a rack and pinion drive mechanism that is driven by a motor, an encoder can be used to count the quantity of rotations of the pinion to determine the distance the hatch has moved linearly. A certain quantity of rotations may equal a certain distance that the hatch has moved.

One problem with this method is slippage of the pinion on the rack. If the rack is damaged or some foreign material has fouled the teeth of the rack, the pinion may be turning without any corresponding movement of the hatch. The rotation count is therefore going to be inaccurate resulting in an inaccurate measurement of the hatch movement.

Another problem with such a method is that the loss of power to the measurement device can result in a loss of awareness of the position of the hatch. For example, the rotation count may determine that the hatch has been opened half-way. If the power to the measurement mechanism is lost and then subsequently restored, the count that was stored in memory is reset to zero and, therefore, the present position of the hatch is now unknown.

There is a need in the art for an improved way to measure and track linear motion.

SUMMARY

The present invention encompasses an apparatus to measure linear distance using a non-driven, extendable arm that converts the linear movement to a rotational movement. In one embodiment, the arm is telescoping to convert the linear distance into rotary using multiple fixed points. The extensions allow the apparatus to track a plurality of distances.

The linear distance measurement apparatus comprises a non-driven arm that is mounted such that an arc movement of the arm describes a linear distance. A rotary sensor mechanism is coupled to the non-driven arm. The sensor measures the arc movement of the arm and translates the arc movement to the linear distance.

DETAILED DESCRIPTION

The embodiments of the present invention provide a means for measuring linear motion using a non-driven, extendable arm and rotary sensor. The apparatus can measure and keep track of a linear movement even if the drive mechanism malfunctions or power to the apparatus is lost.

Figure 1:
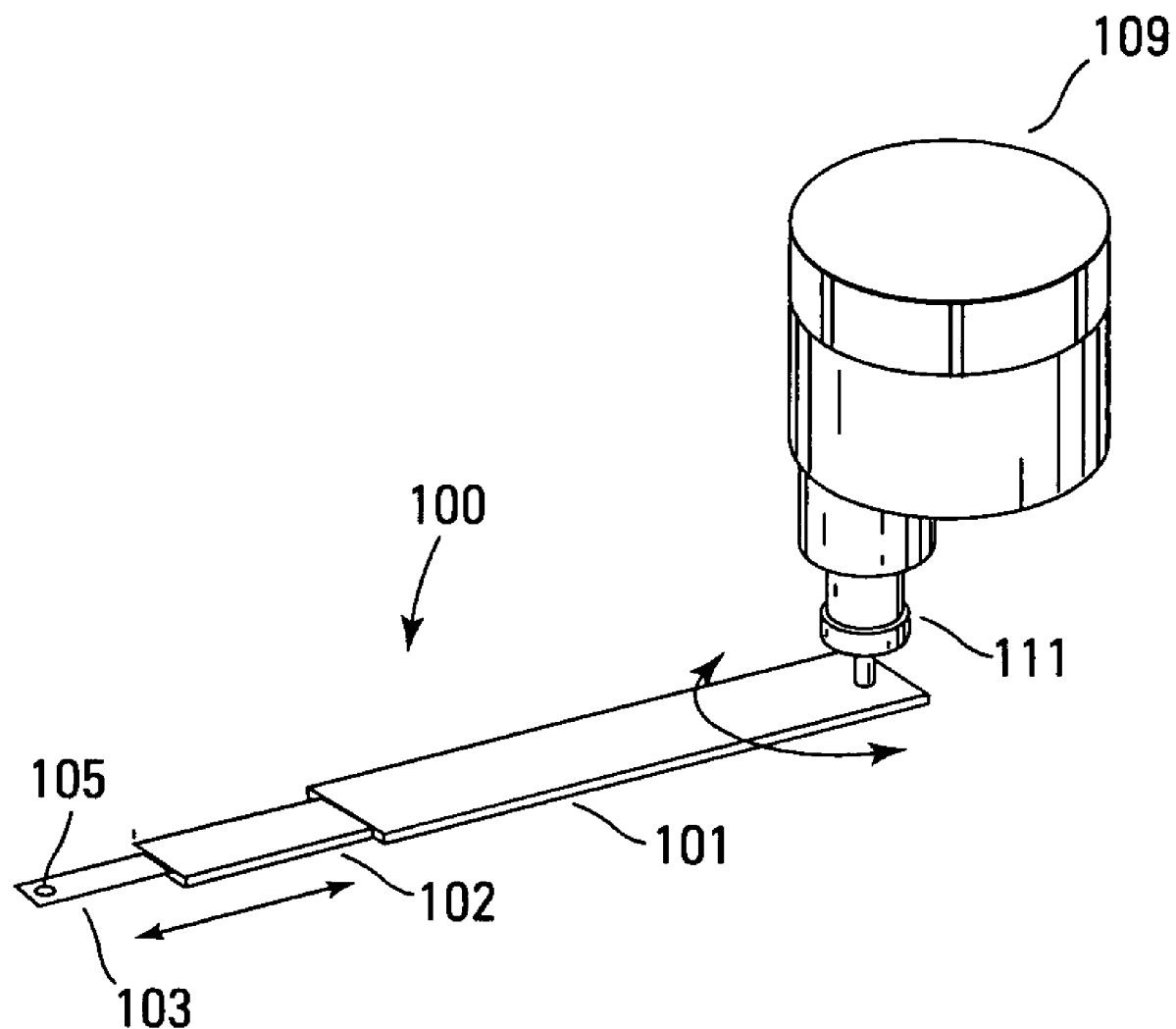
FIG. 1 shows one embodiment of an extendable arm and sensor mechanism of the present invention.

FIG. 1 illustrates one embodiment of a non-driven, extendable arm 100 and sensor mechanism 109 of the present invention. In the illustrated embodiment, the arm 100 is comprised of the main portion 101 of the arm 100 multiple extensions 102, 103. The extensions 102, 103 telescope within the main portion 101 thus enabling the arm 100 to extend and retract as it moves in an arc around the sensor 109.

The quantity of extensions 102, 103 is dependent on each application. For example, one embodiment of the arm 100 may be comprised of only the main portion 101 of the arm 100 and one extension 103. Still other embodiments that have larger slide gates may require more than two extensions 102, 103.

The last extension 103 can have a hole 105 through which a mounting bolt or other mounting device can be attached. Alternate embodiments can use other means for mounting the arm 100 to a hatch or slide gate.

The extendable arm 100 is coupled to the sensor mechanism 109 through a rotating shaft 111 and internal gearing, in one embodiment, that transfers the rotation of the arm 100 to the sensor mechanism 109. The sensor mechanism 109 can be an encoder that measures the amount of arc of a circle through which the arm 100 moves.

In one embodiment, the encoder is an optical encoder that employs a light source (e.g., light emitting diode) on one side of a disk and a light sensor on the other side of the disk. The disk has multiple apertures through which the light is allowed to pass as the disk rotates. The light sensor then determines the rotary position of the disk and thus the position of the shaft that is coupled to the encoder. Encoders are well known by those skilled in the art.

While the embodiment of FIG. 1 uses an encoder to measure the arc and, therefore, the linear distance that the extendable arm moves, alternate embodiments can use other measurement means. For example, a potentiometer may be used to determine the amount of arc through which the arm moves by measuring different voltage levels at various positions of the slide gate. In another embodiment, the Hall effect of a magnetic sensor can be used.

Figure 2:
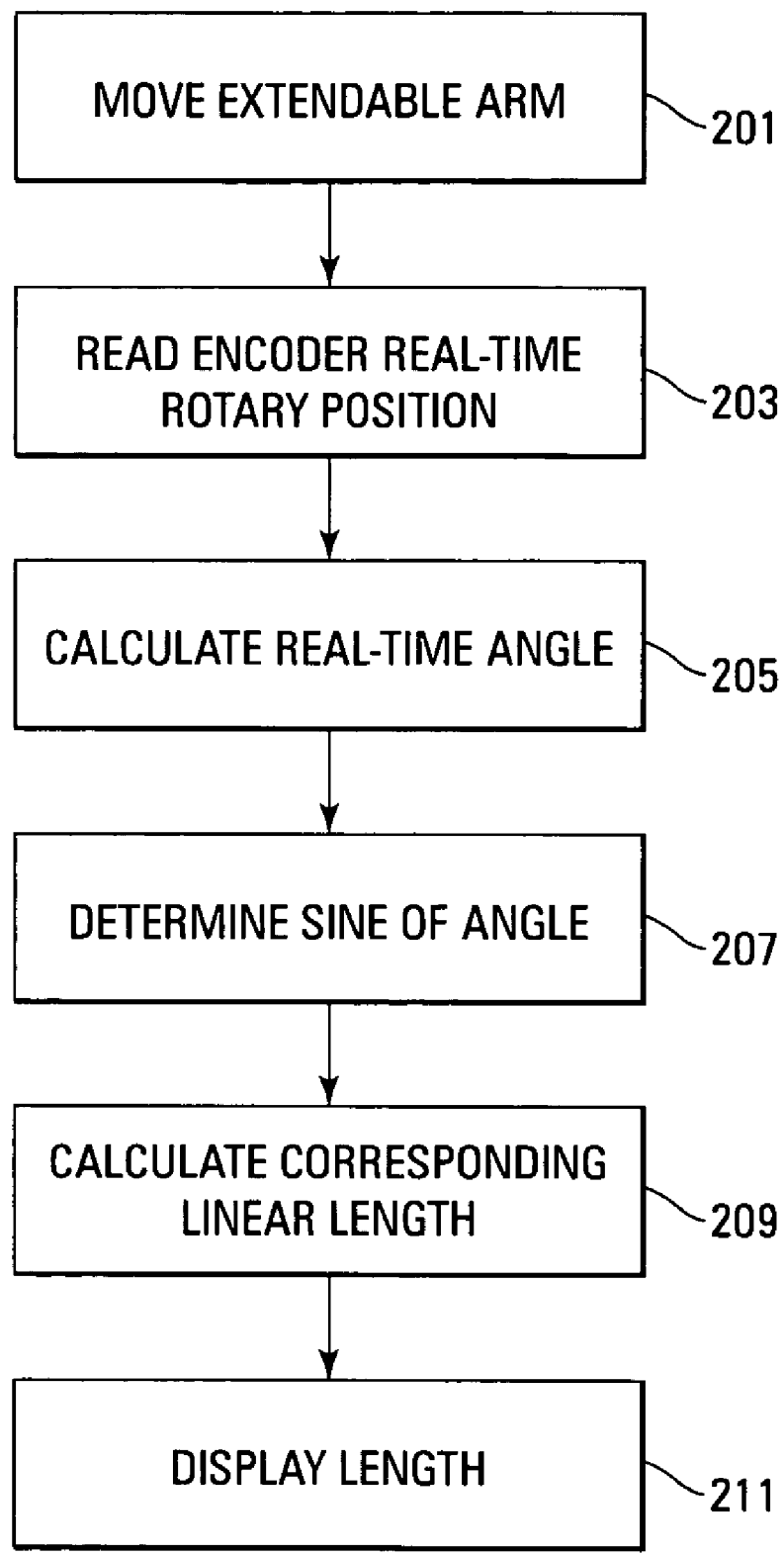
FIG. 2 shows a flowchart of one embodiment of a method for measuring linear distance.

FIG. 2 illustrates a flowchart of one embodiment of the method of the present invention for determining linear distance from a rotary sensor. This method assumes initial location settings have been determined. In one embodiment, this can be accomplished by a calibration operation in which a certain number of encoder positions are assigned to different positions of the slide gate. For example, 0 counts might be the closed position, 256 counts the fully open position, and 128 counts the half open position. In alternate embodiments, these encoder positions for the initial location settings may also be determined in ways other than an initial calibration (e.g., estimates).

After the non-driven, extendable arm moves 201, the real-time rotary position value is determined from the encoder 203. This value is compared with the initial location setting of the fully closed position to calculate the corresponding real-time angle 205 of the extendable arm. The sine of that angle is then determined 207. This can be accomplished by a look-up table stored in the memory of a system controller (not shown).

The corresponding linear length 209 is then determined from the sine of the angle 207. This can be accomplished by using the mathematical Law of Sines triangle formula. This law can be represented as length of triangle side a=length of triangle side b*(sin(angle A)/sin(angle B)) where A is the angle opposite side a and B is the angle opposite side b. The linear length is indicative of how wide the slide gate is open. In one embodiment, the length is represented in percentage of open (i.e., 50% open). Alternate embodiments can represent the length in units of inches, feet, meters, or other linear units. If the system incorporates a display, the linear length can be displayed.

Figure 3:
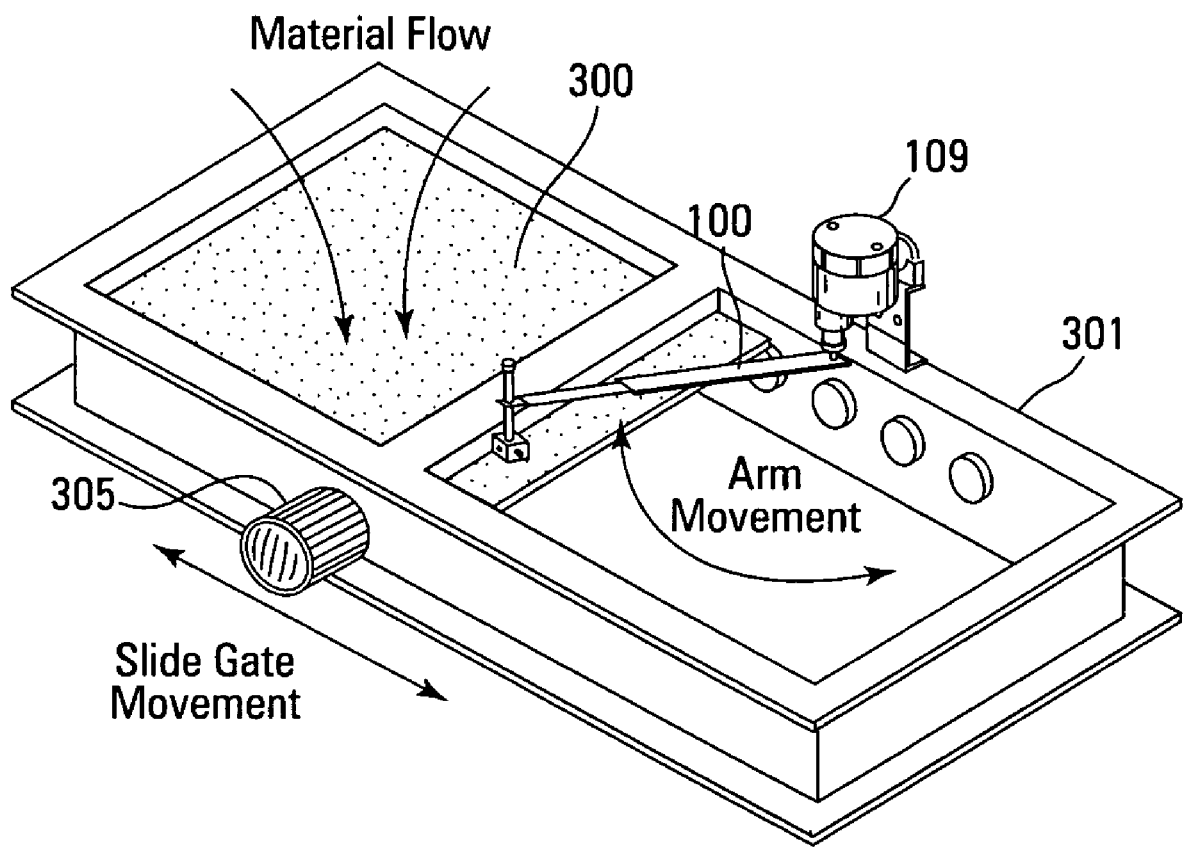
FIG. 3 shows a top perspective view of one embodiment of a slide gate system of the present invention that incorporates the arm and sensor mechanism of FIG. 1.

FIG. 3 illustrates a top perspective view of one embodiment of a slide gate system with the present invention that incorporates the non-driven, extendable arm and sensor mechanism of FIG. 1. The slide gate system illustrated can be used to allow grain or other material to flow through to a lower area. This flow is shown by the Material Flow direction as indicated. This system is for purposes of illustration only as the embodiments of the present invention can be used to measure linear distances of applications other than slide gates.

The system of FIG. 3 is comprised of a slide gate 300 that moves laterally through a frame 301. The movement of the slide gate 300 is controlled by an electric motor 305 that drives a pinion. The pinion is comprised of teeth that fit into the rack on the underside of the slide gate 300. As the motor 305 turns the pinion, the teeth of the pinion move the rack and thus the slide gate 300. While the rack and pinion drive gear are not shown, these elements are well known by those skilled in the art.

Alternate embodiments of the slide gate system can use other methods than the electric motor and rack and pinion drive for moving the slide gate or hatch. For example, the embodiments can include a pneumatic or hydraulic ram or a screw drive to slide the gate 300.

When the sensor mechanism of the present invention is mounted on a slide gate system as shown in the embodiment of FIG. 3, the extendable arm 100 is extended when the slide gate 300 is fully closed. As the slide gate 300 moves to a partially open position, the arm 100 begins to retract so that the extension or extensions of the arm slide into the main portion of the arm as illustrated in FIG. 1. The arm 100 is at its shortest length when it is substantially perpendicular with the frame 301 side. As the slide gate 300 continues to open further, the arm 100 again begins to extend outward in a telescoping fashion until it is at its maximum extension when the gate 300 is fully open.

This system in FIG. 3 shows that as the slide gate 300 opens, the arm moves in an arc of approximately 90°. Depending on the sensing scheme used, this may translate into a rotational movement of greater or less than 90° within the encoder 109. Alternate embodiments that use different sensing schemes may translate the 90° movement into alternative movements or may not translate the movement at all.

The sensor processor, that can be located within the sensor mechanism housing 109, is responsible for reading the rotational movement of the sensor. The processor can then translate this movement into a linear distance as described previously.

The embodiment of FIG. 3 shows that the extendable arm is a non-driven measurement device that converts the linear movement of the slide gate to a rotary motion. This is in contrast to prior art measurement devices that use a rotary drive shaft to perform the measurements on linear movement but are susceptible to the problems described previously.

Numerous modifications and variations of the present invention are possible in light of the above teachings. It is therefore to be understood that within the scope of the appended claims, the invention may be practiced otherwise than as specifically described herein.

What is claimed is:

1. A linear distance measurement apparatus comprising:
a moveable arm mounted such that an arc movement of the arm describes a linear distance wherein the arm is not directly driven and the arm is adapted to telescope as it moves through the arc such that a first end of the arm moves only substantially linearly along the linear distance; and
a rotary sensor mechanism, coupled to a remaining end of the movable arm, for sensing the arc movement of the arm and translating the arc movement to the linear distance.

2. The apparatus of claim 1 wherein the sensor mechanism is an optical encoder.

3. The apparatus of claim 1 wherein the sensor mechanism electrically detects rotation.

4. The apparatus of claim 3 wherein the sensor mechanism is one of a potentiometer or a magnetic sensor.

5. The apparatus of claim 1 wherein the first end of the movable arm that is opposite the rotary sensor mechanism is mounted to a slide gate.

6. A linear distance measurement apparatus comprising:
a movable, extendable arm having a plurality of extension sections adapted to telescope within a main section wherein the arm is not directly driven and the arm is adapted to telescope both in and out as it moves through an arc such that a first end of the arm moves only in a linear fashion; and
a rotary sensor mechanism, coupled to an opposite end of the arm from the first end, for sensing the arc movement of the arm and translating the arc movement to a linear distance along which the first end moves.

7. The apparatus of claim 6 wherein the rotary sensor mechanism is an encoder that is adapted to sense a rotary motion of the coupled end of the non-driven arm.

8. The apparatus of claim 7 wherein the encoder is an optical encoder that converts light patterns to determine a degree of rotation of the non-driven arm.

9. The apparatus of claim 6 and further including a sensor processor coupled to the rotary sensor mechanism to perform the translation of the arc movement to the linear distance.

10. A slide gate system comprising:
a slide gate that is adapted to move;
means for moving the slide gate; and
a linear distance measurement apparatus coupled to the slide gate and not connected to
the means for moving, the apparatus comprising:
a moveable arm mounted such that an arc movement of the arm describes a linear distance wherein the arm is not directly driven and the arm is adapted to telescope as it moves around the arc such that a first end of the arm moves only substantially linearly along the linear distance; and
a rotary sensor mechanism, coupled to a remaining end of the movable arm, for sensing the arc movement of the arm and translating the arc movement to the linear distance.

11. The system of claim 10 wherein the means for moving includes an electric motor coupled to a rack and pinion system.

12. The system of claim 10 wherein the means for moving includes a screw drive.

13. The system of claim 10 wherein the slide gate is adapted to move laterally between an open and a closed position in a frame assembly.

14. A method for measuring a linear distance as indicated by a movable, extendable arm coupled to a rotary sensor mechanism in a slide gate system, the method comprising:
  detecting an arc movement of the movable, extendable arm wherein an opposite end of the arm from the sensor mechanism coupled end moves only along a substantially linear path in response to a telescoping movement of the arm;
  determining an angle of the arm with a predetermined reference point;
  determining a sine value of the angle; and
  determining a linear length along the substantially linear path that corresponds to the sine value.

15. The method of claim 14 and further including calibrating the movable, extendable arm and a sensor processor to determine the reference point.

16. The method of claim 15 wherein the reference point is a closed position of the slide gate.

* * * * *